(12) United States Patent
Goldstein et al.

(10) Patent No.: US 8,442,690 B2
(45) Date of Patent: May 14, 2013

(54) VEHICLE SYSTEM MONITORING AND COMMUNICATIONS ARCHITECTURE

(75) Inventors: David B. Goldstein, Washington, NJ (US); George Daniel Hadden, Plymouth, MN (US); Darryl Busch, Eden Prairie, MN (US); Sunil Menon, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 604 days.

(21) Appl. No.: 12/493,750

(22) Filed: Jun. 29, 2009

(65) Prior Publication Data
US 2010/0332715 A1  Dec. 30, 2010

(51) Int. Cl.
*G05B 13/00* (2006.01)

(52) U.S. Cl.
USPC .......................................................... 700/275

(58) Field of Classification Search .................. 700/275; 702/182
See application file for complete search history.

(56) References Cited

U.S. PATENT DOCUMENTS

| | | | |
|---|---|---|---|
| 5,369,584 A | 11/1994 | Kajiwara | |
| 5,500,944 A | 3/1996 | Yoshida | |
| 5,835,873 A | 11/1998 | Darby et al. | |
| 6,002,996 A | 12/1999 | Burks et al. | |
| 6,360,152 B1 | 3/2002 | Ishibashi et al. | |
| 6,448,671 B1 | 9/2002 | Wallace et al. | |
| 6,766,230 B1 | 7/2004 | Rizzoni et al. | |
| 6,773,029 B2 | 8/2004 | Hamperl et al. | |
| 6,816,764 B2 | 11/2004 | Coelingh et al. | |

(Continued)

FOREIGN PATENT DOCUMENTS

| | | | |
|---|---|---|---|
| EP | 1791047 A2 | * | 11/2006 |
| EP | 1791047 A2 | * | 11/2006 |
| EP | 1791047 A2 | | 5/2007 |

OTHER PUBLICATIONS

Shen S., et al.; Fuzzy Decision Making Through Energy-Aware and Utility Agents Within Wireless Sensor Networks; Artificial Intelligence Review, Kluwer Academic Publishers, Do, vol. 27, No. 2-3, Oct. 25, 2008, pp. 165-187, XP019638845.

(Continued)

*Primary Examiner* — Mohammad Ali
*Assistant Examiner* — Sivalingam Sivanesan
(74) *Attorney, Agent, or Firm* — Ingrassia Fisher & Lorenz, P.C.

(57) ABSTRACT

Systems, methods and devices are provided that allow more efficient transfer and processing of sensor information in a hierarchical data system. The system provides for a plurality of component area managers (CAM), each of the CAMS being in operable communication with at least one of a plurality of transducers that monitors a phenomena of a component and in operable communication with a data bus. A CAM comprises a processor in operable communication with the at least one transducer of the plurality of transducers, wherein the first processor is configured to record data generated by the at least one transducer of the plurality of transducers, to reduce the recorded data, to place the reduced data on the data bus. The system also includes a transducer selection module controlled by the first processor by which the first processor selects one of the plurality of transducers to record and a rolling buffer in operable communication with the first processor and in operable communication with the at least one transducer by which to record the data generated by the at least one transducer of the plurality in a first-in-first-out manner.

19 Claims, 6 Drawing Sheets

U.S. PATENT DOCUMENTS

| | | |
|---|---|---|
| 6,950,782 B2 | 9/2005 | Qiao et al. |
| 7,072,751 B2 | 7/2006 | Shimizu |
| 7,162,333 B2 | 1/2007 | Koibuchi et al. |
| 7,209,860 B2 | 4/2007 | Trsar et al. |
| 7,263,446 B2 | 8/2007 | Morin et al. |
| 7,269,762 B2 | 9/2007 | Heckmann et al. |
| 7,274,981 B2 | 9/2007 | Eriksson |
| 7,276,703 B2 * | 10/2007 | Berkcan et al. ............ 250/358.1 |
| 7,317,974 B2 | 1/2008 | Luskin et al. |
| 7,379,799 B2 | 5/2008 | Cleary et al. |
| 7,406,399 B2 * | 7/2008 | Furem et al. ................. 702/182 |
| 7,558,701 B2 * | 7/2009 | Andarawis et al. ........... 702/183 |
| 7,860,664 B2 * | 12/2010 | Loomis et al. ................. 702/35 |
| 2003/0216889 A1 * | 11/2003 | Marko et al. ................. 702/182 |
| 2003/0217873 A1 * | 11/2003 | Paradiso et al. ............ 178/18.04 |
| 2004/0153287 A1 * | 8/2004 | Kirshenbaum et al. ....... 702/187 |
| 2006/0235707 A1 * | 10/2006 | Goldstein et al. ................. 705/1 |
| 2008/0167833 A1 | 7/2008 | Matsen et al. |
| 2008/0209995 A1 * | 9/2008 | Taylor et al. .................... 73/146 |
| 2009/0138141 A1 * | 5/2009 | Nwadiogbu et al. .............. 701/3 |

OTHER PUBLICATIONS

European Search Report, EP 10160231.6-2206 dated Sep. 23, 2010.

\* cited by examiner

VEHICLE SYSTEM MONITORING AND COMMUNICATIONS ARCHITECTURE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided by the terms of contract M67854-01-C-0001 awarded by General Dynamics Amphibious Marine Systems.

FIELD OF THE INVENTION

The present invention generally relates to methods and systems used to reduce data flow on a network bus. Specifically, the methods and systems reduce the data flow by processing raw sensor data at a computing device that is electronically as close to an originating transducer as possible and transmitting the data to a higher level computing device in a traffic efficient manner.

BACKGROUND OF THE INVENTION

Modern vehicles and manufacturing processes are often configured with various systems that monitor and record raw data during operations for later analysis by operating and maintenance personnel. The raw data is typically originated by a variety of sensor transducers installed to measure physical phenomena at important points within the various systems in the vehicle or manufacturing process. Once originated, the data is transmitted to a central computing device for processing, analysis and display. As technology improves, users of that technology increasingly demand that more and more data be provided to the central computing device about the particular vehicle or process. As such, the computing power of the central computing device and the limited bandwidth of the installed data bus are increasingly challenged. Adding additional bandwidth is expensive and potentially disruptive.

Other complexities may arise at the central computing device where data originated at different sensors and/or sub-system components may have native data formats that are disparate and incompatible. For example, a preferred accelerometer may produce an analog output where a preferred thermometer may generate a digital output. Further, a global positioning system ("GPS") may produce an output in the form of a packetized digital message. The translation and reconciliation of disparate data types either limits the type sensor that may be used or increases the complexity of the signal processing that may be done at the central computer device.

Accordingly, it is desirable to utilize methods and systems that maximize bandwidth utility and reduce processing complexity. Further, other desirable features and characteristics of the present invention will become apparent from the subsequent detailed description of the invention and the appended claims, taken in conjunction with the accompanying drawings and this background of the invention.

SUMMARY

A system is provided for reducing data flow on a data bus. The system includes a plurality of component area managers (CAM) each of the plurality being in operable communication with at least one of a plurality of transducers that monitors a phenomena of a component and each CAM of the plurality of CAMs being in operable communication with a data bus. Each CAM comprises a first processor in operable communication with the at least one transducer of the plurality of transducers, wherein the first processor is configured to record data generated by the at least one transducer of the plurality of transducers, to reduce the recorded data, to place the reduced data on the data bus. Each CAM also includes a transducer selection module controlled by the first processor by which the first processor selects one of the plurality of transducers to record and a rolling buffer in operable communication with the first processor and in operable communication with the at least one transducer by which to record the data generated by the at least one transducer of the plurality in a first-in-first-out manner. The system further comprises a sub-system area manager (SAM) in operable communication with the plurality of CAMs via the data bus, the SAM comprising a second processor configured to selectively receive the reduced data placed on the data bus, analyze the data received from the at least one of the plurality of CAMs and fuse the data received from the plurality of CAMs for presentation to a user.

A hierarchical method for minimizing data on a data bus for a complex system is also provided. The method comprises selectively recording a plurality of transducer data outputs into a rolling buffer by a first computing device that is in direct communication with each of the plurality. The transducer data outputs provide component performance information of a plurality of components. The method also comprises monitoring the recorded transducer data outputs to identify operational features within the transducer data outputs, reducing the transducer data outputs in the rolling buffer concerning the operational features by digitally processing the transducer data outputs concerning the features of interest into summary form, and placing the operational features in summary form onto the data bus by the first computing device.

A device for reducing sensor data locally is provided. The device comprises a processor in operable communication with at least two transducers. The processor is configured to record data generated by the at least two transducers and to reduce the recorded data. The device also includes a transducer selection module controlled by the processor over an internal control bus by which the processor selects at least one of the at least two transducers to record. The device further includes a rolling buffer in operable communication with the processor and in operable communication with the at least two transducers by which the processor records the data generated from a set of the at least two transducers in a first-in-first-out manner.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an amphibious assault vehicle. However, it will be understood by those of ordinary skill in the art that the subject matter is similarly applicable to many other vehicle types and to many disparate manufacturing processes. Non-limiting examples of other vehicle types in which the subject matter herein below may be applied includes aircraft, spacecraft, watercraft and other terrestrial motor vehicles. Non-limiting examples of manufacturing processes in which the subject matter herein below may be applied includes chemical production, power generation, power transmission, assembly lines, water purification, etc. Examples of vehicles and processes where the application of the subject matter disclosed herein would be found useful is manifold.

Figure 1:
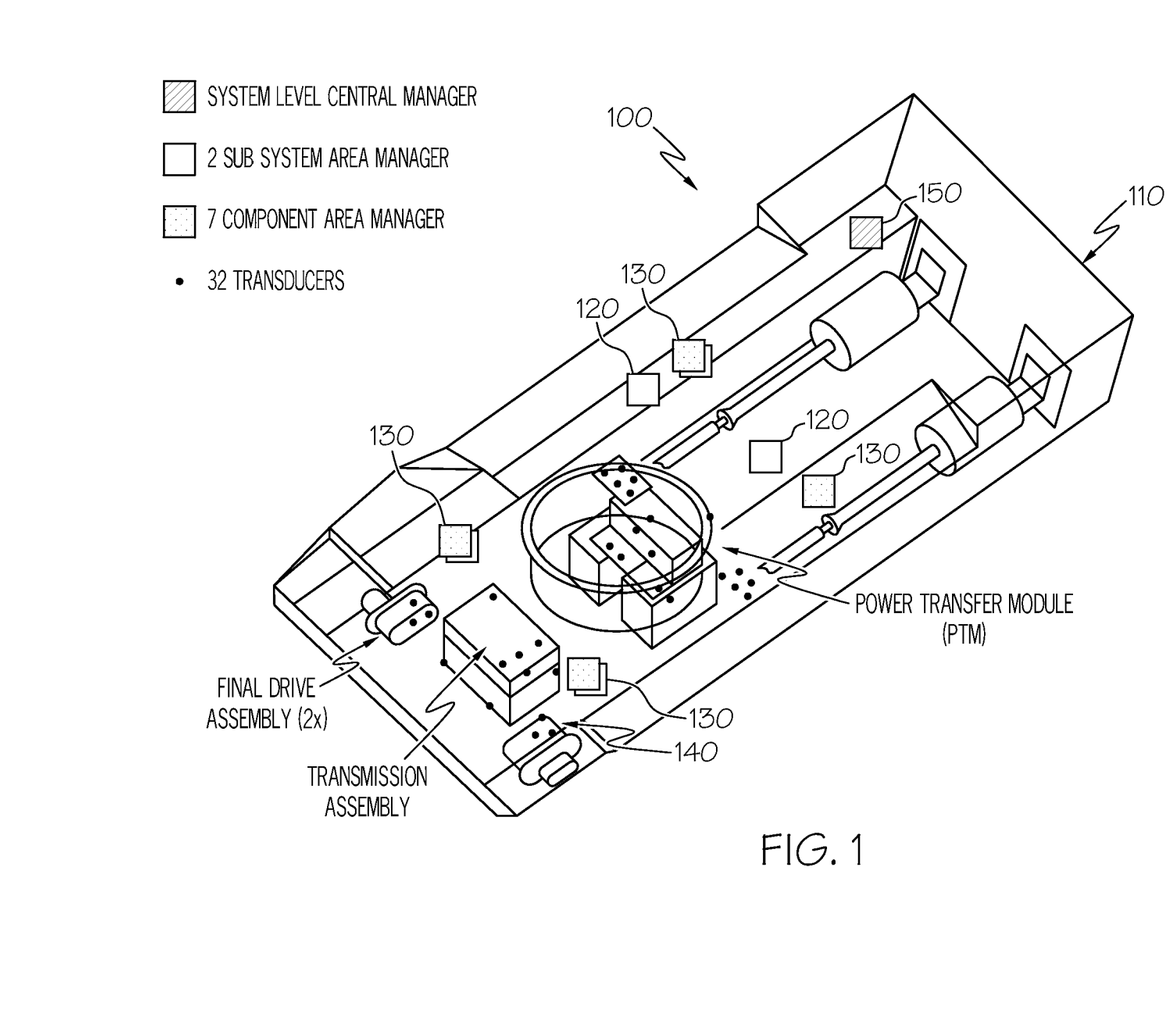
FIG. 1 is a cut away of a vehicle incorporating an exemplary embodiment of the subject matter disclosed herein.
Figure 3:
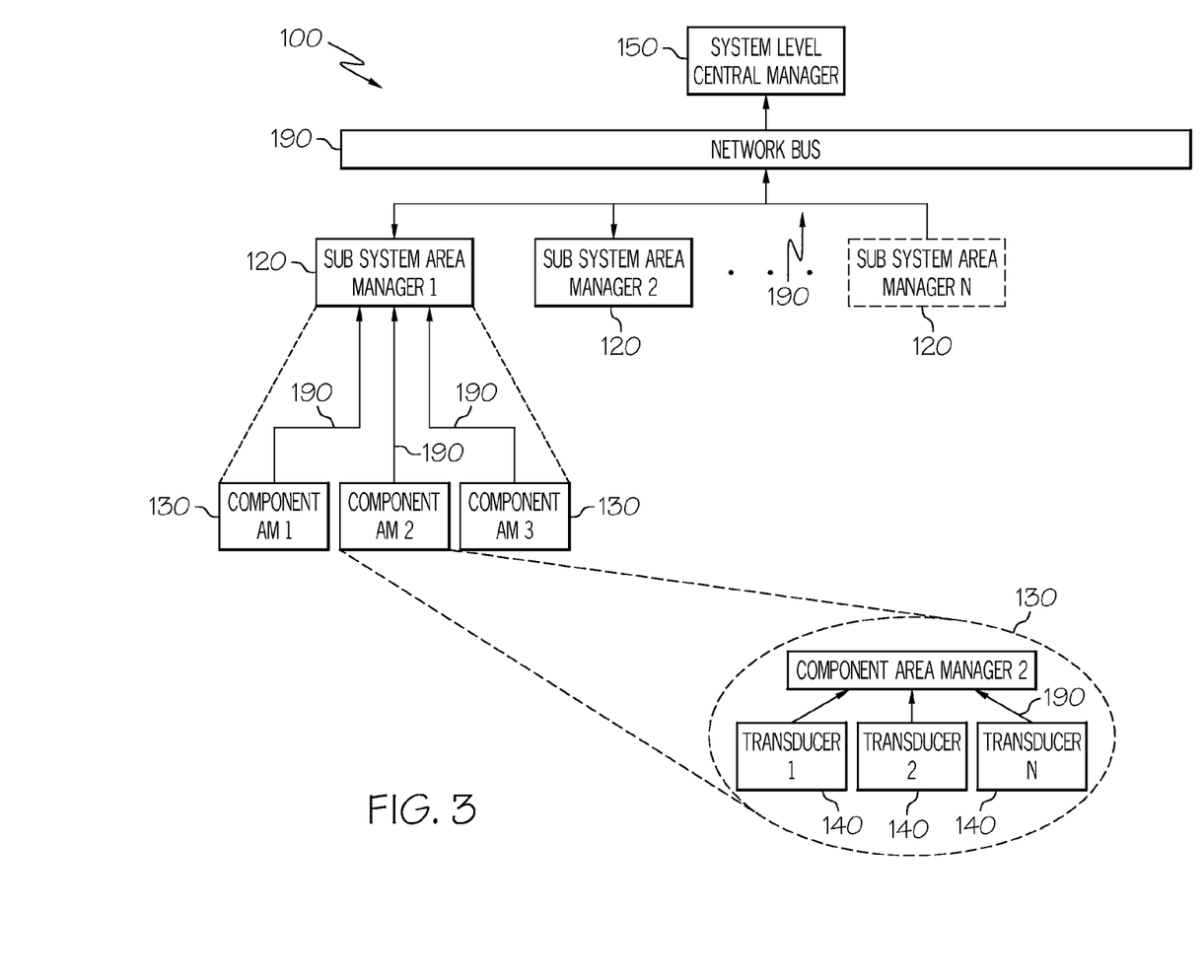
FIG. 3 is an exemplary embodiment of the hierarchical structure of the subject matter disclosed herein.

FIGS. 1 and 3 illustrate a simplified rendition of the drive train of an amphibious assault vehicle 110 including an exemplary application of the herein disclosed data system 100 applied thereto. The data system 100 comprises a plurality of transducers 140 associated with various components of interest in the vehicle 110. In this simplified example, the transducers 140 may be attached to the transmission assembly, the final drive assembly and the power transfer model, among other possible components. The transducers 140 may be any type of transducer suitable to detect physical phenomena of interest and to electronically transmit an absolute or relative indication of the phenomena which may also be referred to as "operational features". Non-limiting examples of suitable transducers 140 are myriad and may include accelerometers, thermometers, radio frequency detectors, acoustic sensors, pressure sensors, photo-diodes, tachometers, humidity detectors, odometers, chemical detectors (e.g. carbon monoxide, diesel fuel, mustard gas, nerve agents), voltmeters, ohmmeters, speedometers, etc. The output of the transducers 140 may be analog or digital.

Other types of devices are also herein contemplated to be transducers 140. These other types of transducers 140 may generate digital and/or packetized messages as their output instead of raw analog or digital data streams. Non-limiting exemplary types of messaging transducers include global positioning systems 155 (GPS), digital chemical analyzers, cameras, security systems and the like.

The data system 100 also includes a plurality of Component Area Managers ("CAM") 130 that are in operable communication with higher level computing devices, with other CAMs (130) and with the transducer(s) 140 via wireless or via wireline connections. Wireless communications may be accomplished using any known or future wireless protocol. A non-limiting example of a wireless protocol would be any of the 802.11 series of wireless protocols such as Wi-fi, Wi-max, Bluetooth and Zigbee. Wired networks may have any topology as may be known in the art.

A CAM 130 is a low level computing device that is in operable communication with, and is configured to monitor, the electronic output of one or more of the transducers 140. The various transducers 140 monitored by the CAM 130 may be attached to the same piece of equipment (e.g. the Final Drive Assembly) or may be attached to related components (e.g. Transmission Assembly and the Final Drive Assembly). The transducer(s) 140 may be incorporated within the CAM 130 or be located distant from the CAM 130.

As will be disclosed further herein below, the CAM 130 comprises computing, signal processing and data storage capability with which to process data locally, thereby reducing data transmission load to a central computing device. The CAM 130 may also perform data transmission on a basis that minimizes the data load of a data bus 190. The CAM 130 is configured to communicate data to a higher level computing device and to receive commands and/or instructions from a higher level computing device via the data bus 190. The CAM 130 may also comprise built-in-test ("BIT") circuitry that may provide operational data about itself as may be known in the art.

The data bus 190 may be any suitable communications bus as is known in the art. The data bus 190 may be a synchronous bus, an asynchronous bus or may include both. The data bus 190 may also include a dedicated messaging bus. The type of bus may be dictated by the size and complexity of the vehicle or manufacturing process being monitored. As non-limiting examples, a civilian automobile may utilize a simple controller area network bus (a "CANbus") which is a vehicle bus standard designed to allow microcontrollers and devices to communicate with each other within a vehicle without a host computer. Another non-limiting example of a bus may be Ethernet communication via the internet or an intranet for use in ships. The data bus 190 may also be configure to deliver power to the transducers 140, the CAMS 130 and higher level network components, as may be known in the art.

Other types of data busses 190 may also be useful in other situations dealing with significant distances between network components or requiring stringent timing of bus traffic. Other non-limiting examples of data buses that my be used to implement the subject matter herein include a CAN bus with time division multiple access ("TDMA"), a VMEbus, Ethernet, Ethernet, Avionics Full-Duplex Switched Ethernet, multi-drop TDMA (Mil-Std-1553), and the like.

At higher network levels between the CAM 130 and the central computing device, the data system 100 includes one or more subsystem area managers ("SAM") 120 that may be configured in a hierarchical structure. A SAM 120 is a computing device configured to communicate data from a CAM 130 up to a higher level computing device via data bus 190, to communicate commands and instructions down to lower level SAMs 120 and/or CAMs 130, or to coordinate data transfers between any SAMs 120/CAMs 130 on the same data system level. The SAM 120 may comprise data storage, however, in some embodiments data storage may be a remote mass storage device (not shown) in the data system 100.

The SAM 120 may have sufficient computing capability and memory to ask for specific data from one or more particular CAMs 130 or SAMs 120 in the data system 100 and then monitor for, or compute, specific features of interest ("features of interest"). A SAM 120 may perform higher level processing of information, including extracting indication of faults, isolating faults, and reducing performance data.

Figure 2:
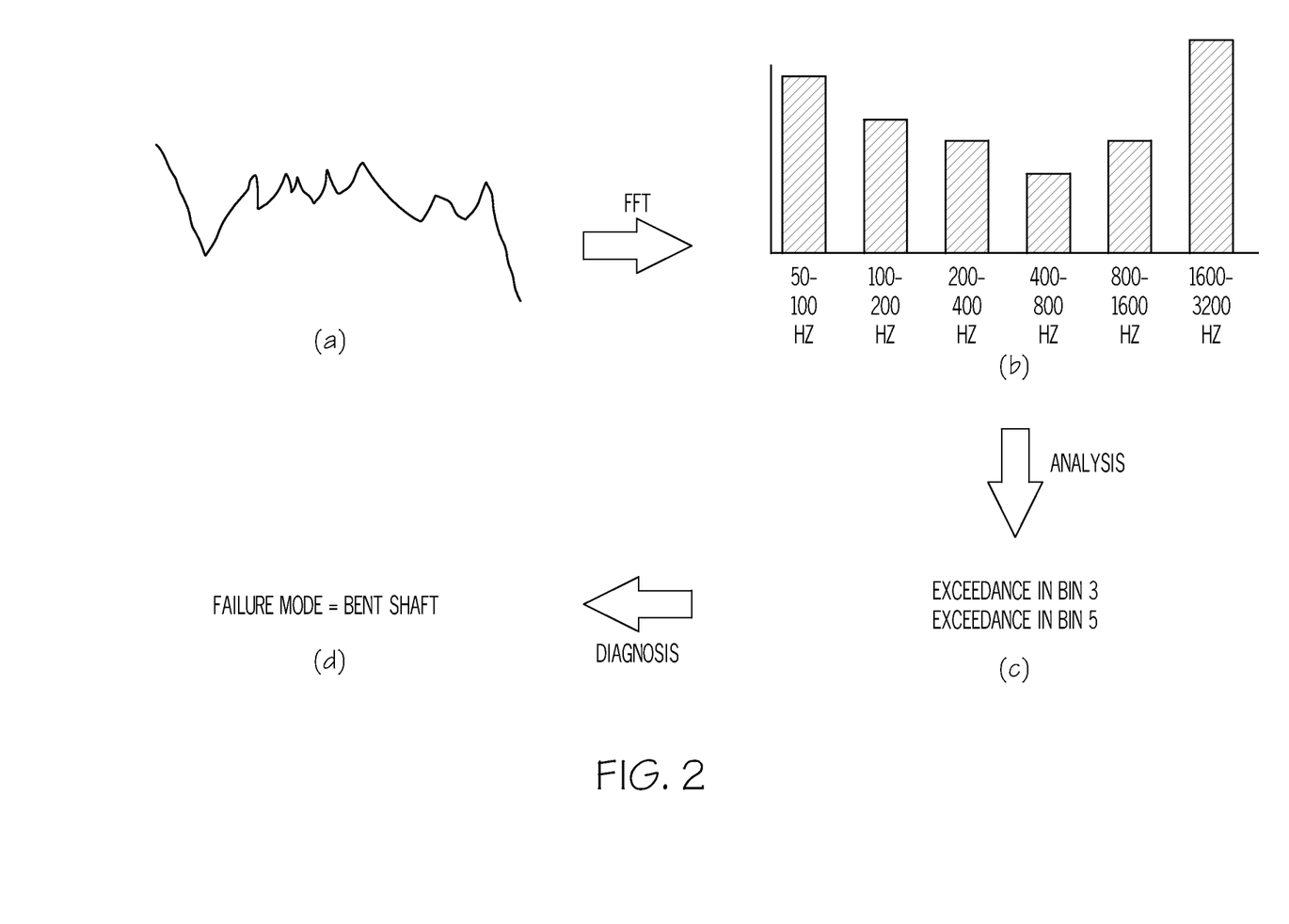
FIG. 2 is a simplified illustration of a means for data reduction.

FIG. 2a-b is a simple, non-limiting example of a data reduction method that may be used to reduce vibration data. In this example, vibration data may be received as a time series by a vibration transducer 140. The SAM 120 or the CAM 130 may sample and process the time series (e.g. Fourier analysis) to reduce the vibration time series into discrete vibration bandwidth bins, such as illustrated in FIG. 2b. Thereafter, transmitting the reduced time series across the data bus 190 requires less bandwidth than transmitting the entire time series.

The data system 100 also includes a system level control manager ("SLCM") 150 which is the highest level computing device in the data system 100. In addition to the capabilities incorporated into the SAM 120, the SLCM 150 is configured to interface with a user either on line or via a report generator and a printer (not shown). The SLCM 150 is further configured to synthesize the data received from the SAMs 120 and the transducers 140, such as a GPS system 155, and to communicate a vehicle failure, or the existence of conditions that may be pre-cursors to a vehicle system failure. One of ordinary skill in the art will recognize that the SLCM may be a function of, and integrated into a SAM rather than being a stand alone device.

FIG. 3 is a functional block diagram depicting a non-limiting exemplary hierarchical network structure that may be utilized for the data system 100 for the vehicle of FIG. 1. It would be appreciated by one of ordinary skill in the art that there may exist multiple operational levels of SAMs 120 where one SAM 120 may perform higher order data fusion and analysis than a SAM 120 of a lower level. However, in order to minimize the data load on the bandwidth of the data bus 190, it is preferred that raw sensor data be processed and/or fused at the lowest level possible commensurate with the operation of the vehicle or manufacturing process.

Figure 4:
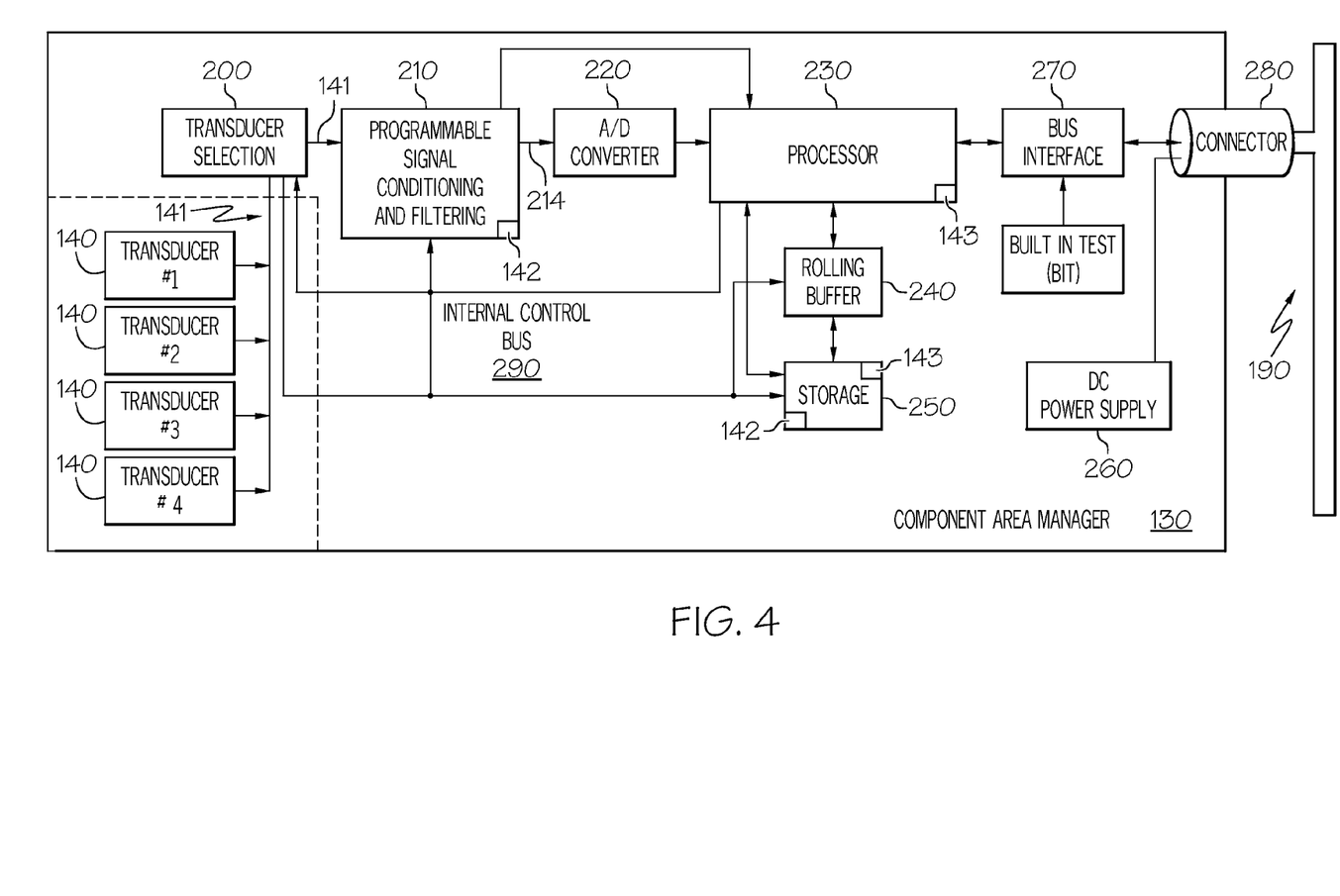
FIG. 4 is a functional block diagram of an exemplary embodiment of a Component Area Manager.

FIG. 4 is a depiction of a non-limiting, exemplary functional block diagram of a CAM 130. The CAM 130 may comprise a processor 230 which includes digital signal processing functionality. In alternative embodiments, there may be a separate digital signal processor. The CAM 130 also comprises a signal filter 210, an analog-to-digital converter 220, a bus interface 270, a rolling buffer 240, a non-volatile memory device 250, a rechargeable DC power supply 260 and a bus connector 280. It will be appreciated by those skilled in the art that the above component mix is exemplary and may be modified. Components may be combined together, components may be separated into their constituent parts and components may be substituted for other components with similar functionality and still fall within this disclosure.

The processor 230 controls the operation of the CAM 130 and a plurality of transducers 140 that are operably coupled to the CAM 130 via a transducer selection circuit 200. In some embodiments the processor may enable or disable one or more of the plurality of transducers 140 using the transducer selection circuit 200. In other embodiments, processor 230 may merely select which transducer output 141 will be received by the transducer selection circuit 200 for processing by the CAM 130. Control over the transducer selection circuit 200 may be accomplished over an internal control bus 290.

When received from the transducer selection circuit 200, the raw transducer output 141 is filtered and processed to remove any bias and/or noise by the signal filtering circuit 210. The output 141 being filtered may be an analog signal or a digital signal as may reflect the type of transducer 140 from which the output was generated. The signal filtering circuit 210 may be any suitable filtering circuit 210 known in the art.

In alternative embodiments, the filtering circuit 210 may be a programmable logic device ("PLD") such as a field programmable gate array ("FPGA"). An FPGA may allow a signal filter module 142 of the signal filter circuit 210 to be changed essentially instantaneously to correspond to the type transducer 140 selected. The various programming for the signal filter module 142 may be stored in a local non-volatile storage device such as memory device 250.

The analog-to-digital converter 220 may be any suitable A/D converter that may be known in the art. To the extent that a transducer output 141 is already in digital form, the A/D converter may be bypassed as directed by the signal filtering module 142.

The bus interface 270 may be any suitable network interface circuit ("NIC") that facilitates digital communication with the data system 100. As a non-limiting example, the network may be a CANbus. In a CANbus, the bus interface may be a CAN controller with a synchronous clock. The processor 230 stores received bits from the data bus 190 until an entire message has been received and can be retrieved by the processor 230 or other processor within the bus interface 270. Conversely, the bus interface 270 may store an outgoing message and then transmit them serially to the data bus 190. In other embodiments including an intranet, the bus interface 270 may be a protocol server or a gateway server. The bus interface 270 is connected to the data bus 190 via a suitable connector 280. The data bus 190 and the internal control bus 290 may be non-limiting examples of a computer readable medium. Depending on the type of bus 190 chosen, data may be multicast, unicast or broadcast.

The DC power supply 260 provides power for all of the components of the CAM 130 and may also provide power for the transducer(s) 140 in that may be in operable communication with the CAM 130. The DC power supply may be a rechargeable battery in which case the data bus 190 may supply power to recharge the DC power supply 260. In other embodiments, the data bus 190 may power the CAM 130 directly via the DC power supply 260 which may act as a DC step up or step down transformer. The CAM 130 may also be powered by an outside source (not shown).

The processor 230 may be any suitable microcontroller, processor, digital signal processor, programmable logic device or other type of computing device that may exist or may be developed in the future capable of receiving, analyzing and/or reducing raw transducer input and communicating any processed/reduce data via the data bus 190. The processor 230 may be a single processor, a co-processor, a general purpose processor, a special processor or a hybrid thereof. The processor 230 is also a non-limiting example of a computer readable medium.

The processor 230 is in operable communication with one or more non-volatile and/or volatile mass storage device(s) 250 such as a flash memory. Other non-volatile memory devices may include magnetic disks and field programmable gate arrays ("FPGA"). The memory device 250 may store raw data received directly from one or more transducers 140 or may store processed data received from the processor 230. Memory device 250 may also store data transferred from another CAM 120 via the data bus 190. Data within the memory device 250 may be compressed by the processor 230 using various data compression techniques known in the art. Further, the memory device 250 may contain the signal filer module 142 for the signal filter 210 and/or a programming module 143 for the processor 230. The memory device 250 is a non-limiting example of a computer readable medium.

The CAM 130 includes one or more rolling buffer(s) 240 that are in operable communication with the memory device 250, whereby data that is held in the rolling memory buffer(s) 240 may "roll off" on a first-in-first-out ("FIFO") basis. The rolling buffer 240 contains raw data that is received from one or more transducers 140 for processing by the processor 230. The data within the rolling buffer 240 may be identified by its source (e.g. a specific transducer 140) and by the time the data is received from the source. A rolling buffer 240 may be comprised of any suitable volatile or non-volatile memory device.

Upon reaching the end of the rolling buffer 240, the data in the rolling buffer 240 may be deleted or may roll into permanent storage within the memory device 250 for later recall. In other embodiments, the processor may periodically cause a portion of the data in the rolling buffer to be compressed and transmitted elsewhere in the data system 100. In still other embodiments, data from the rolling buffer 240 may be requested by another device within the data system 100 such as another CAM 130, the SAM 120 or the SLCM 150.

In another embodiment, the data stream 214 is directly processed by the micro processor 230 and may bypass the rolling buffer 240 entirely. Other embodiments may create a copy of a portion of the data stored in the rolling buffer to another memory such as storage memory 250. In such an embodiment the rolling buffer may then continue without pause. In still further embodiments, the rolling buffer 240 may be halted, the data in the rolling buffer processed/reduced by an algorithm executing in the processor 230 and then the rolling buffer restarted.

Figure 5:
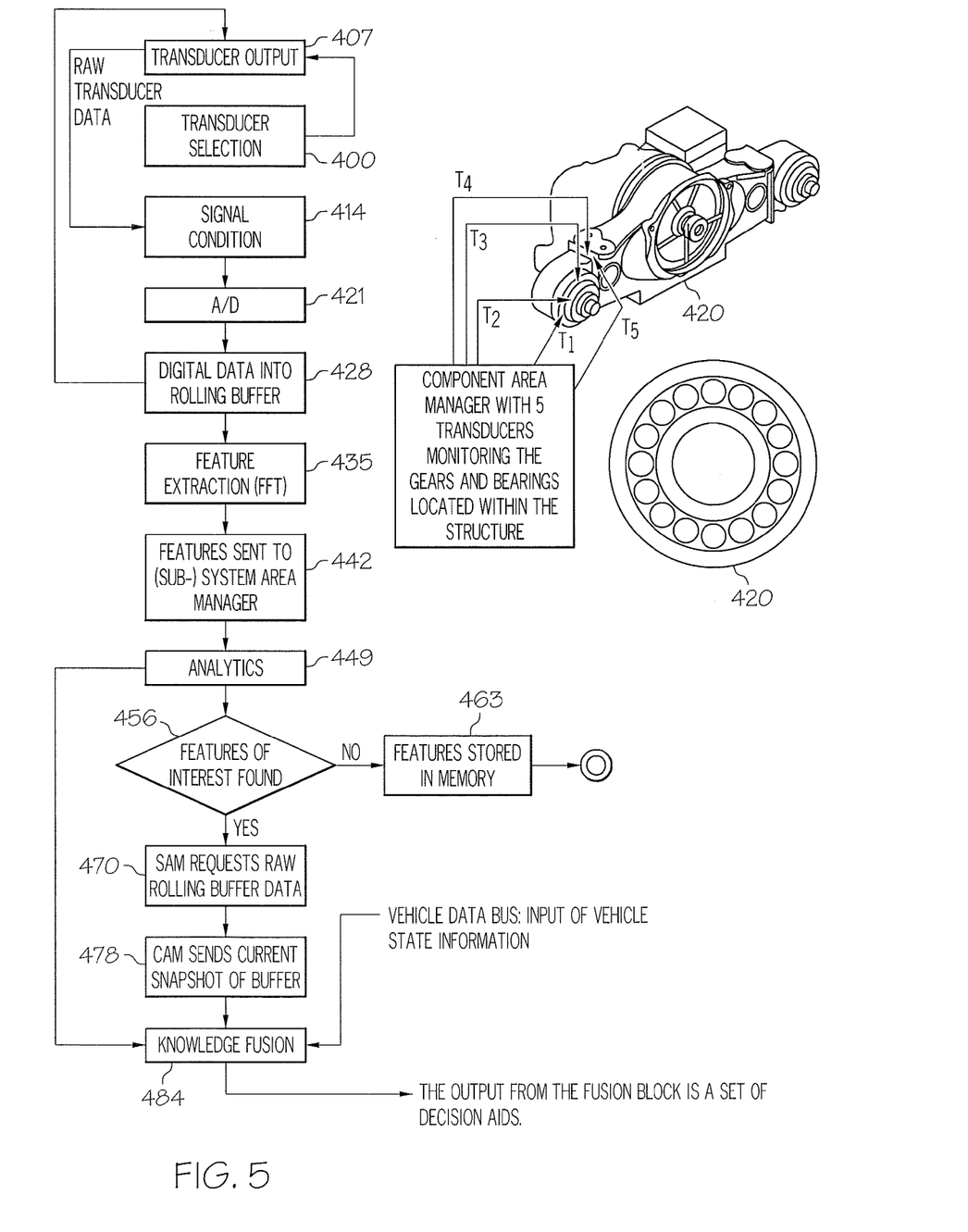
FIG. 5 is a simplified logic flow chart of an embodiment of the subject matter disclosed herein.

FIG. 5 is an exemplary functional flow chart depicting the function of a simplified CAM 130 and SAM 120 monitoring a roller bearing 420. Because the CAM 130 may control any number of different types of transducers 140 and may process the raw output from those transducers using a plethora of algorithms, the following is merely a simplified example and is not intended to limit the complexity or scope of the capabilities of the subject matter disclosed herein.

In this exemplary embodiment, transducer #1 may be an "eddy probe" that monitors the vibration T1 of the roller bearing 420. The transducer #2 may be a thermometer that measures the temperature T2 of the roller bearing 420. For simplicity, it shall be assumed that the vibration T1 may be a fast moving parameter that varies widely due to fluctuating torque demand and background vibration. Conversely, the temperature T2 may be a slow moving value that may within a narrow operating range for months or years unless a failure is immanent. It may also be the case that preceding a roller bearing failure, the temperature T2 tends to spike and the amplitude of the vibration T1 increases dramatically and shifts to a lower frequency range. As such, it may be desirable to monitor both parameters T1 and T2 and it may be desirable to monitor T1 more often than T2.

At process 400, the processor 230 selects the transducer to be monitored. The processor 230 may monitor by commanding the transducer selector circuit 200, using the internal control bus 290, to shunt in the output 141 from the transducer #1 for a period of time. Transducer #1 may be taking several hundred thousand vibration samples per second from roller bearing 420. The processor 230 may also command the transducer selection circuit 200 to shunt out the output 141 from the transducer #1 and shunt in the output 141 from the transducer #2 for a specific period of time, and vice versa. It will be appreciated by one of ordinary skill in the art that to the extent that the CAM 130 controls and monitors additional transducers (e.g. transducers #3-#5), different monitoring periodicities among the transducers may be arranged as may be desired. It will also be appreciated that a higher level computing device (e.g. the SLCM 150) may direct the CAM 130 to monitor a particular parameter thereby overriding the local monitoring schedule controlled by the processor 230.

In other embodiments, the transducer selection circuit 200 may monitor multiple transducers simultaneously utilizing multiple individual channels. Each channel may then be filtered, conditioned and then stored in the rolling buffer 240 which may have multiple channels for data storage on a FIFO basis.

Coordinated CAM algorithms—some algorithms require the coordination of multiple CAMs. E.g. a shaft speed monitor on one CAM and synchronous vibration monitors on another. The SAM coordinates such an algorithm. Input from one or more CAMs may tell the SAM that the conditions are right. The SAM would tell the CAMs to run the algorithm on the data in the rolling buffer. CAMs may need to share data with others (e.g. the shaft synch CAM sends processed shaft data to the vibration CAM so that the vibration CAM can run its algorithm. Sharing may be mediated by the SAM)

Various other monitoring schedules or operational programming for the processor 230 may be stored in memory device 250. As a non-limiting example, if T1 rises to a particular level, a new monitoring schedule may be caused by the processor 230 to be uploaded into the processor 230. The new monitoring schedule may change the mix and or periodicity of parameter sampling or may cause the processor 230 to send messages or data to different computing devices on the data system 100. Monitoring schedules may vary widely as may fit a system design requirement. Monitoring schedules may demand the continuous monitoring of a component, periodic monitoring, conditional monitoring (i.e. engagement of a clutch), or monitoring at the request of another computing device within the data system 100.

Some additional exemplary, non-limiting monitoring methodologies that my be utilized in some embodiments may include mode-based sampling whereby sampling may be controlled by algorithms that may only be available during certain operational modes as may be identified by the SAM 120. Sampling maybe initiated upon detection whereby the CAM 130 observes that the incoming data met some criteria (e.g. constant shaft speed for x seconds). The processor 230 may process specific data in the rolling buffers using algorithms appropriate under those conditions that may be stored in programming module 143. Sampling may also be done upon the occurrence of an event. For example, a CAM may monitor for certain event using an accelerometer (e.g. a physical impact). Sampling and processing algorithms associated with an impact event may be uploaded to, or executed by, the procession 230 upon receiving the impact indication to process data received in the rolling buffer accordingly.

At process 407, the raw transducer output 141 is received. Once the raw transducer output 141 has been received the transducer selection circuit 200 may send the raw transducer output 141 to memory device 250 for later review. In other embodiments, the raw transducer output 141 may also be sent to the signal filtering circuit 210 for processing at process 414. The signal filtering circuit 210 filters out unwanted noise from T1 and/or T2. The filtering may be accomplished as is known in the art by the use of filtering circuits (e.g., band pass, high pass, low pass, etc) which may be implemented by using software and or firm ware. The number and types of useful filtering circuits or the software/firmware that may be utilized is quite large and is beyond the scope of this disclosure.

After filtering, the transducer output 211 may be converted from an original analog form to a digital form by the analog-to-digital converter 220 at process 421. The analog-to-digital converter 220 may be any suitable analog-to-digital converter as may be known in the art and may be comprised of hardware, software, firmware and any combination thereof. To the extent that the raw transducer output 141 is a digital output, the signal filtering circuit 210 may bypass the analog-to-digital converter 220 and send the raw digital transducer data 141 directly to the processor 230. In alternative embodiments, the transducer selection circuit 200 may send the raw transducer output 141, or a copy thereof to memory device 250 for storage.

In still other embodiments, the raw transducer output 141 may be transmitted to one or more rolling buffers 240 at process 428. As raw data 141 is received, it is digitized and placed into the rolling buffer 240 until analyzed by the processor 230 in process 435. The rolling buffer(s) 240 may be incorporated within another CAM 130 component (i.e. processor 230) or be separate components. The rolling buffer 240 may receive the raw transducer output 141 on a FIFO basis. While in the rolling buffer 240, the processor 230 may operate on the data either in the order of receipt or in some directed order.

When sufficient transducer output 211 is accumulated in the rolling buffer 240, the processor 230 may search the rolling buffer 240 for all temperature readings T2 for the roller bearing, retrieve them, and then process the accumulated T2 sample data. In other embodiments different data streams 214 from different sensors may have their own location in the rolling buffer. The processor 230 would simply retrieve the T2 data from a certain time period. The processor may analyze and reduce the T2 sample data to a T2 summary or a "feature extraction" of T2. The T2 feature extraction may then be transmitted via data bus 190 to another network computing device. Because the feature extraction is a summary, the bandwidth required to transmit the feature extraction is small compared to transmitting the entire time series.

The role of the rolling buffer 240 is to keep a stream of data in memory long enough for the processor 230 to take actions. The processor 230 can run algorithms 143 on a portion of the data stream from the recent past. The processor 230 may not immediately know whether the data is suitable for a particular algorithm. The processor 230 may idle for minutes waiting for the SAM 120 to indicate the right conditions have occurred or are occurring. As an example, the SAM 120 may direct the CAM 130 to process the data from the 30second time period that started 40seconds ago.

After feature extraction 435, the raw data may be deleted as the raw data reaches the end of the rolling buffer 240 on the FIFO basis. In other embodiments at least some of the raw data may be compressed and stored within a mass storage device, such as the memory device 250, for later retrieval. On the other hand, the extracted feature may be transmitted to a SAM 120 or to higher level computing device for further processing in process 442 via the bus interface 270. One of ordinary skill in the art will recognized that the raw transducer output 211 may also be transmitted to a SAM 120 or higher level computing device in addition to the extracted feature. More specifically, in some embodiments the SAM 120 may direct the CAM 130 to also send the raw data based on an a priori acquisition schedule. The SAM 120 may also do this may do this upon the detection of an event or a specific pattern of data.

Similarly, the T1 sample data may be selected from the first rolling buffer 240 and processed in the same fashion. The processed T1 sample results may also be saved in memory 250, saved to the same rolling buffer as the T2 sample results or saved to still another rolling buffer that may be dedicated to the T1 data. It will be appreciated that the actual number of rolling buffers 240 and their configuration in regards to the various transducer data may vary according to the application.

Figure 6:
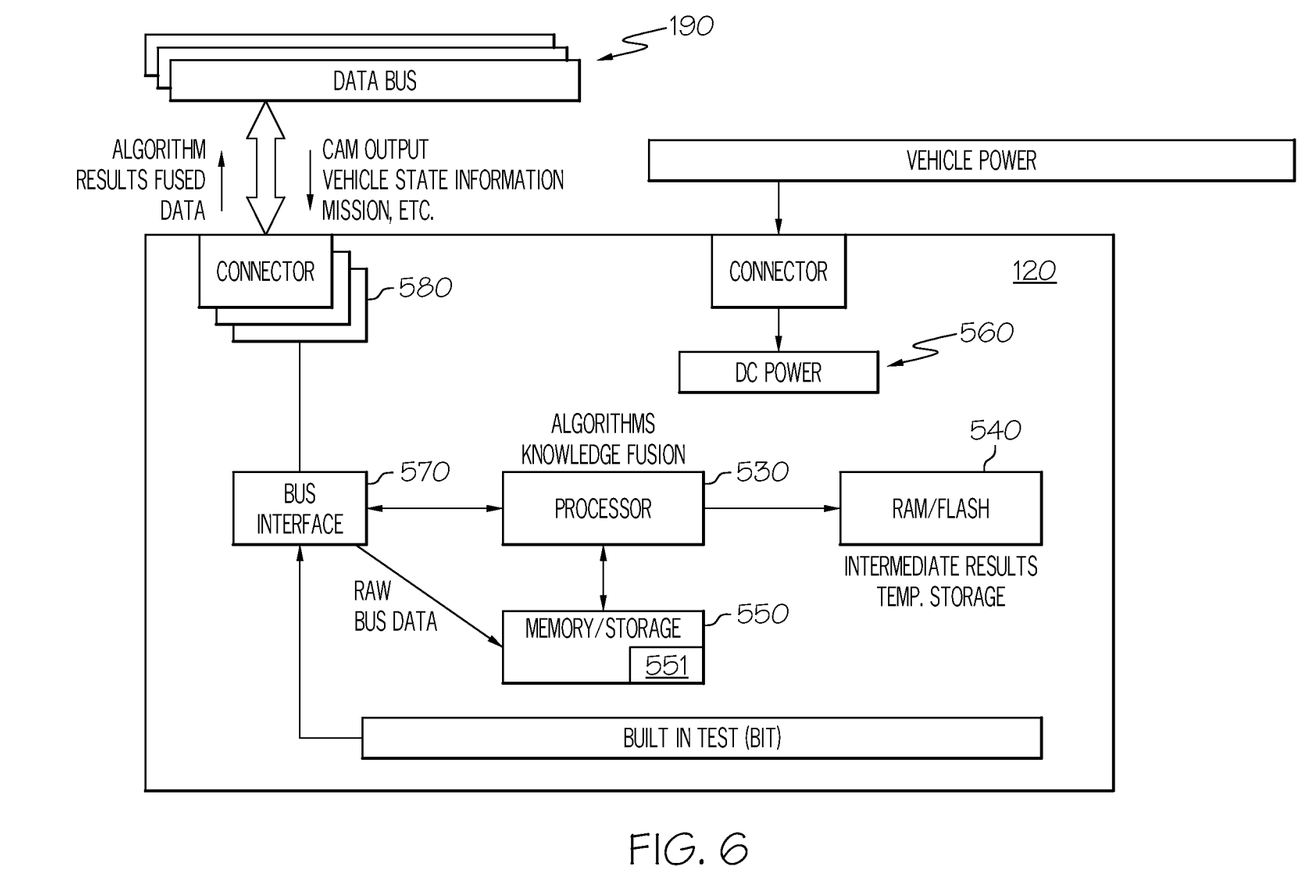
FIG. 6 is a functional block diagram of an exemplary embodiment of a higher level computing device such as a Sub-system Area Manager or a System Level Control Manager.

Before describing the remaining process steps, reference should first be made to FIG. 6 which is a depiction of a non-limiting, exemplary functional block diagram of a SAM 120 or a SLCM 150, and which will now be described. The SAM 120 may comprise a microcontroller 530. The SAM 1320 also comprises a bus interface 570, a temporary memory 550, a memory device 540, a DC power supply 560 and a bus connector 580. It will be appreciated by those skilled in the art that the above component mix is exemplary and may be modified. Components may be combined together, components may be separated into their constituent parts and components may be substituted for other components with similar functionality and still fall within this disclosure. It will also be recognized that in alternative embodiments DC power may be provided to the DC power supply 560 over the data bus 190.

The bus interface 580 may be any type of suitable bus interface. For a given type of data bus, the interface 580 may be the same as or at least compatible with the bus interface 270. The bus interface may be in operable communication with the processor 530 and with a memory device 550.

In some embodiments, the memory device 550 may be long term, non-volatile memory. The memory device 550 may also be in direct operable communication with the processor 530 and may be any type of volatile or non-volatile memory currently in existence or that will be developed in the future. Non-limiting examples of memory device 550 include magnetic disks, EEPROMs, FPGAs and flash memory. Memory device 550 may store raw data received over the bus interface 270 or it may receive processed data from the processor 530. Memory device 550 may contain various sets of instructions 551 that may program processor 530 when directed by a higher level SAM 120 or an SLCM 150.

The instructions 551 may comprise coordinated CAM algorithms that handle the coordination of multiple CAM 130 operations. For example, a shaft speed transducer on one CAM 130 and synchronous vibration monitor on another CAM 130 may provide coordinated data collection and analysis. The instruction 551 may coordinate an algorithm that executes such a task. Input from one or more CAMs 130 may tell the SAM 120 that the conditions are right. The SAM 120 may tell the CAMs 130 to run the algorithm on the data in the rolling buffer(s) 240. Further, the CAMs 130 may need to share data with others (e.g. a shaft synch CAM 130 sends processed shaft data to the vibration CAM 130 so that the vibration CAM 130 can run its algorithm. Sharing may be mediated by the SAM 120.

The processor 530 may be any suitable microcontroller, processor, digital signal processor, programmable logic device or other type of computing device that may exist or may be developed in the future capable of receiving, analyzing and/or reducing raw transducer input and communicating any processed/reduce data via the data bus 190. The processor 530 may process raw data received over bus interface 570 or retrieved from temporary memory 550. The processor 530 may be any suitable processor in existence or to be developed in the future and may be a single processor, a co-processor, a general purpose processor, a programmable logic device, a special processor or a hybrid thereof. Processor 530 and temporary memory 550 are non-limiting examples of computer readable media.

The SAM 120 may also include an intermediate storage device 540 for storing processed or extracted features developed by the processor 530. The intermediate storage device 540 may also be in direct operable communication with the processor 530 and may be any type of volatile or non-volatile memory currently in existence or that will be developed in the future. Non-limiting examples of temporary memory 550 include random access memory (RAM), electronically erasable programmable read only memory (EEPROM), field programmable gate arrays (FPGA) and flash memory. Temporary memory 550 may store raw data received over the bus interface 270 or it may receive processed data from the processor 530. Temporary memory 540 is a non-limiting examples of computer readable media. One of ordinary skill in the art will recognize that the intermediate storage device 540 and the temporary storage device may be logical sectors on a single memory device, may be separate devices or may also be external devices in communication with the processor 530 via the data bus 190.

In addition to storing data, the intermediate memory 540 may also contain various sets of instructions that may program processor 530 when directed by a higher level SAM 120 or an SLCM 150 should the processor 530 be a programmable logic device (PLD) such as an FPGA or another type of PLD that currently exists or may be developed in the future. He sets of instructions Referring back to FIG. 5, the SAM 120 receives the features and any raw data from the CAM 130 into temporary memory 550 or directly into the processor 530. The output generated by process 442 includes initial extracted features as well as the results from the various algorithms. At process 449, the features and any raw data from the CAM 130 are analyzed for indication of a failure or general health of the vehicle 110. Any number of analytics may be performed as may be desired by one of ordinary skill in the art.

At process 456, a determination is made as to whether any features of interest are detected in the data received and processed by the SAM 120/SLCM 150. If not, then any data and/or features processed are stored in memory device 550 in the SAM/SLCM at process 463. If features of interest are detected, then the SAM 120 may request a snapshot of raw rolling buffer data residing at the CAM 130 at process 470. The snapshot of its rolling buffer data is transmitted over the data bus 190 at process 478, and then stored in memory device 550.

At process 484, a knowledge fusion takes place whereby the data collected that is related to the feature of interest that was analyzed in process 449 is combined together with the pertinent raw data requested from the CAM 130, or one feature may be fused with another. In the case of the roller bearing example used here in, the data fused may include features identified in the slow moving temperature T2 fused with raw rolling data of the vibration T1 for further analysis by a higher level computing device or for display. One of ordinary skill in the art will recognize that any number or combinations of data may be fused into a data block at process 484. Non-limiting examples may include GPS location, time, engine speed, vehicle speed, environmental information and various commands such as shift commands and driver commands, and the like. Output from the fusion block is a set of decision aids. If this is a SAM 120, this output will be the SAM's best prediction of current state and potential future state of the sub system of interest. If it is a SLCM 150, the output will be a fused conclusion of the entire vehicle's state.

The output from the knowledge fusion process 484 comprises a set of decision aids. In the case of a SAM 120, the output would be the best prediction of the current state of the sub-system of interest (i.e. the roller bearing) and the potential future state of that that sub-system. In the case of a SLCM 150, the output would be a fused conclusion of the current state of the entire vehicle 100.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for reducing data flow on a data bus comprising:
   a data bus;
   a plurality of transducers, each transducer configured to monitor a physical phenomenon of a component;
   a plurality of component area managers (CAM), each CAM of the plurality being in operable communication with at least one of a plurality of transducers and also in operable communication with the data bus, each CAM comprising:
   a first processor in operable communication with the at least one transducer of the plurality of transducers, wherein the processor is a programmable logic device that may be reprogrammed by a higher level computing device via the data bus from instructions recorded from a memory storage device, wherein further the first processor is configured to record data generated by the at least one transducer of the plurality of transducers, to reduce the recorded data, and to place the reduced data on the data bus,
   a transducer selection module controlled by the first processor, whereby the first processor selects one of the plurality of transducers from which to record data, and
   a rolling buffer in operable communication with the first processor and in operable communication with the at least one transducer to record the data generated by the at least one transducer of the plurality in a first-in-first-out manner; and
   a sub-system area manager (SAM) in operable communication with the plurality of CAMs via the data bus, the SAM comprising a second processor configured to selectively receive the reduced data placed on the data bus, analyze the data received from the at last one of the plurality of CAMs and fuse the data received from the plurality of CAMs for presentation to a user.

2. The system of claim 1, wherein the data bus is a CANbus.

3. The system of claim 2, wherein the transducer selection module is commanded to record data from a second of the plurality of transducers by the SAM.

4. The system of claim 2, wherein the transducer selection module is operably altered by conditionally receiving instructions from a programming module residing in memory.

5. The system of claim 1, wherein the data bus is an intranet.

6. The system of claim 1, comprising a system level central manager (SLCM) in operable communication with the SAM, the SLCM fusing data received from the SAM to provide a system wide assessment to a user.

7. A hierarchical method for minimizing data on a data bus for a complex system, comprising:
   selectively recording transducer data output supplied from a plurality of transducer data outputs into a rolling buffer by a first computing device that is in direct communication with each of the transducers, the transducer data outputs providing component performance information of a plurality of components;
   at the first computing device, monitoring the recorded transducer data outputs to identify operational features within the transducer data outputs, wherein the first computing device is a programmable logic device that may be reprogrammed by a higher level computing device via a data bus from instructions recorded from a memory storage device;

at the first computing device, reducing the transducer data outputs in the rolling buffer concerning the operational features by digitally processing the transducer data outputs concerning the features of interest into summary form; and placing the operational features in summary form onto the data bus by the first computing device.

8. The method of claim 7, wherein the transducer data outputs are deleted upon reaching the end of the rolling buffer.

9. The method of claim 7, wherein the transducer data outputs are stored in a local storage device for later recall.

10. The method of claim 7, further comprising:

receiving the operational features over the data bus by a higher level second computing device;

at the second computing device, analyzing the operational features received from the first computing device;

at the second computing device, determining if features of interest exist;

at the second computing device fusing the features of interest and the operational features received from the first computing device with related operational features and features of interest received from the other, similarly situated computing devices based on the analyzing step; and placing the fused operational features and the features of interest on the data bus for communication to a user of the complex system.

11. The method of claim 10, further comprising:

when features of interest exist, then storing the operational features in long term memory at the second computing device.

12. The method of claim 11, further comprising:

when features of interest do exist, then:

requesting the transducer data outputs related to the features of interest from the rolling buffer of the first computing device.

13. A device for reducing sensor data locally comprising:

a processor in operable communication with at least two transducers, wherein the processor is a programmable may be reprogrammed by a higher level computing device via the data bus from instructions recorded from the memory storage device, wherein further the processor is configured to record data generated by the at least two transducers and to reduce the recorded data;

a transducer selection module controlled by the processor over an internal control bus by which the processor selects at least one of the at least two transducers to record generated data, and a rolling buffer in operable communication with the processor and in operable communication with the at least two transducers by which the processor records the data from a set of the at least two transducers in a first-in-first-out manner.

14. The device of claim 13, further comprising a bus interface in operable communication with the processor, the bus interface operable to place data on a data bus at the direction of the processor.

15. The device of claim 14, further comprising a programmable signal conditioning and filter circuit receiving the data generated by the at least two transducers, whereby raw transducer output is filtered and conditioned for further processing, the signal conditioning and filter circuit being controlled by the processor over the internal bus.

16. The device of claim 15, wherein the programmable signal conditioning and filter circuit comprises a programmable logic device that uploads processing instructions from a memory storage device commensurate with the transducer output being selected by the transducer selection module.

17. The device of claim 16, further comprising a bypassable analog-to-digital (A/D) converter that receives conditioned and filtered analog data from the at least two transducers and provides digital input to the processor, wherein all digital data received from the at least two transducers is shunted directly to the processor by the programmable signal conditioning and filter circuit.

18. The device of claim 17 that receives power provided over the data bus.

19. The device of claim 18 wherein the data bus is a CAN-bus.

* * * * *

UNITED STATES PATENT AND TRADEMARK OFFICE
CERTIFICATE OF CORRECTION

| | | |
|---|---|---|
| PATENT NO. | : 8,442,690 B2 | |
| APPLICATION NO. | : 12/493750 | |
| DATED | : May 14, 2013 | |
| INVENTOR(S) | : Goldstein et al. | |

It is certified that error appears in the above-identified patent and that said Letters Patent is hereby corrected as shown below:

In the Claims:

Column 12, line 41, "last" should be changed to --least--.

Signed and Sealed this
Second Day of July, 2013

Teresa Stanek Rea
*Acting Director of the United States Patent and Trademark Office*